US010303556B1

(12) United States Patent
Banerjee et al.

(10) Patent No.: US 10,303,556 B1
(45) Date of Patent: May 28, 2019

(54) MODIFIABLE VOLUME SNAPSHOTS

(71) Applicant: Veritas Technologies LLC, Mountain View, CA (US)

(72) Inventors: Amitrajit Banerjee, Maharashtra (IN); Sujit Shrinivas Shembavnekar, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 494 days.

(21) Appl. No.: 14/526,745

(22) Filed: Oct. 29, 2014

(51) Int. Cl.
*G06F 17/30* (2006.01)
*G06F 11/14* (2006.01)

(52) U.S. Cl.
CPC .... *G06F 11/1458* (2013.01); *G06F 17/30174* (2013.01)

(58) Field of Classification Search
CPC .................. G06F 11/1458; G06F 17/30174
USPC ............................................................ 707/639
See application file for complete search history.

(56) References Cited

U.S. PATENT DOCUMENTS

| | | | | |
|---|---|---|---|---|
| 5,963,959 A * | 10/1999 | Sun | ............... | G06F 17/30578 |
| 7,925,623 B2 * | 4/2011 | Therrien | ............... | G06F 11/1448 707/610 |
| 8,326,803 B1 * | 12/2012 | Stringham | ............... | G06F 11/1466 707/652 |
| 9,171,002 B1 * | 10/2015 | Mam | ............... | G06F 17/30091 |
| 9,195,670 B1 * | 11/2015 | Mam | ............... | G06F 11/1451 |
| 9,535,907 B1 * | 1/2017 | Stringham | ............... | G06F 11/1435 |
| 2005/0066095 A1 * | 3/2005 | Mullick | ............... | G06F 17/30171 710/200 |
| 2007/0276885 A1 * | 11/2007 | Valiyaparambil | ... | G06F 11/1451 |
| 2008/0082593 A1 * | 4/2008 | Komarov | ............... | G06F 11/1451 |
| 2008/0256141 A1 * | 10/2008 | Wayda | ............... | G06F 3/0608 |
| 2010/0179941 A1 * | 7/2010 | Agrawal | ............... | G06F 11/1451 707/624 |
| 2011/0010515 A1 * | 1/2011 | Ranade | ............... | G06F 11/1451 711/162 |
| 2011/0289058 A1 * | 11/2011 | Anzai | ............... | G06F 17/30067 707/650 |
| 2012/0166757 A1 * | 6/2012 | Volvovski | ............... | G06F 17/30 711/206 |
| 2013/0103644 A1 * | 4/2013 | Shoens | ............... | G06F 17/3023 707/638 |
| 2013/0167145 A1 * | 6/2013 | Krishnamurthy | ... | G06F 9/45558 718/1 |
| 2013/0173744 A1 * | 7/2013 | Xinglong | ............... | G06F 11/1415 709/217 |
| 2013/0191345 A1 * | 7/2013 | Banerjee | ............... | G06F 17/3007 707/649 |
| 2015/0370641 A1 * | 12/2015 | Susairaj | ............... | G06F 3/06 707/645 |

* cited by examiner

*Primary Examiner* — Kris E Mackes
*Assistant Examiner* — Tiffany Thuy Bui
(74) *Attorney, Agent, or Firm* — Campbell Stephenson LLP

(57) ABSTRACT

Various systems and methods for modifying the contents of a snapshot after the snapshot has been created are disclosed. One such method involves attaching a volume filter driver to a snapshot volume. The method detects one or more modifications intended for data in a read-only snapshot. Upon detecting the modification(s) intended for data in the read-only snapshot, the method performs a write operation, which includes the modification(s), to a secondary storage device instead of a primary storage device.

16 Claims, 9 Drawing Sheets

MODIFIABLE VOLUME SNAPSHOTS

FIELD OF THE INVENTION

This invention relates to data storage and, more particularly, to modifiable volume snapshots.

DESCRIPTION OF THE RELATED ART

A snapshot is a point-in-time copy of data, as that data existed at a discrete point in time. A snapshot represents the state of a storage device at a particular point in time and is used for restoring data backup functions in the event of failure of the storage device. Snapshots are typically available instantly upon creation to applications for the purposes of data analysis, data protection, data replication, etc. Modern operating systems such as Windows™ 7 provide in-built mechanisms for creating snapshots of data stored in a storage device.

Copy-on-write (COW) is a storage optimization strategy. In the context of snapshots for the purposes of data storage (e.g., storage snapshots), COW can be used as a storage optimization solution, for example, when implemented by Microsoft™ Volume Shadow Copy Service (VSS), among others. In COW, if a data volume is being written to (e.g., by way of a write operation), a pre-modification copy of the data volume is copied into a pre-designated space allocated for using in creating a snapshot on a storage device.

Therefore, before the write operation makes changes and/or modifications to the data volume, a COW snapshot mechanism (e.g., such as the one implemented by VSS) moves data blocks associated with the data volume to the pre-designated space on the storage device allocated for the snapshot, and thus maintains consistency between the "original" data volume the "snapshot copy" of the data volume.

However, once a snapshot of a data volume is taken, the snapshot is rendered a "read-only" snapshot (e.g., a read-only object) and cannot be modified. For example, once VSS creates a snapshot in Windows™ 7, the contents of the snapshot cannot be modified after the snapshot is created as the snapshot is a read-only snapshot. Therefore, backup data in the snapshot cannot be modified before the backup data is actually saved (e.g., to a backup server).

SUMMARY OF THE INVENTION

Various systems and methods for modifying the contents of a snapshot after the snapshot has been created are disclosed. One such method involves attaching a volume filter driver to a snapshot volume. The method detects one or more modifications intended for data in a read-only snapshot that is stored on the primary storage device. Upon detecting the modification(s) intended for data in the read-only snapshot, the method performs a write operation, which includes the modification(s), to a secondary storage device instead of the primary storage device.

In one embodiment, attaching the volume filter driver is performed after a snapshot of data in the primary storage device is taken. In this example, the snapshot is a read-only snapshot. In another embodiment, performing the write operation includes using the volume filter driver to intercept and route the modification(s) to the secondary storage device.

In some embodiments, the method backs up the read-only snapshot stored in the primary storage device, and the modification(s) intended for data in the read-only snapshot stored in the secondary storage device to a backup server, which includes a backup image. The method then synchronizes data from the read-only snapshot, and the modification(s) intended for data in the read-only snapshot, and further, stores the synchronized data in the backup image on the backup server.

In some embodiments, the primary storage device is coupled to a computing device, and the modification(s) are performed by a file system structure executing on the computing device. In this example, the backup server executes a backup software that is agnostic to the file system structure executing on the computing device, because the volume filter driver operates at a volume level of an operating system executing on the computing device.

In other embodiments, the method exposes the read-only snapshot on the primary storage device to the backup software, and sends the modification(s) intended for data in the read-only snapshot on the secondary storage device to the backup software. The method determines whether the snapshot is a read-only snapshot. If the snapshot is a read-only snapshot, the method attaches the volume filter driver to the read-only snapshot.

In one embodiment, the volume filter driver is an upper volume filter, and the upper volume filter intercepts a request intended to modify data in the read-only snapshot from an application executing on the computing device. The upper volume filter then routes the modification(s) intended for data in the read-only snapshot to the secondary storage device. In some embodiments, the request intended to modify the data in the read-only snapshot includes a read transaction, a write transaction, a request to delete a file in the read-only snapshot, or a request to add a file to the read-only snapshot.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
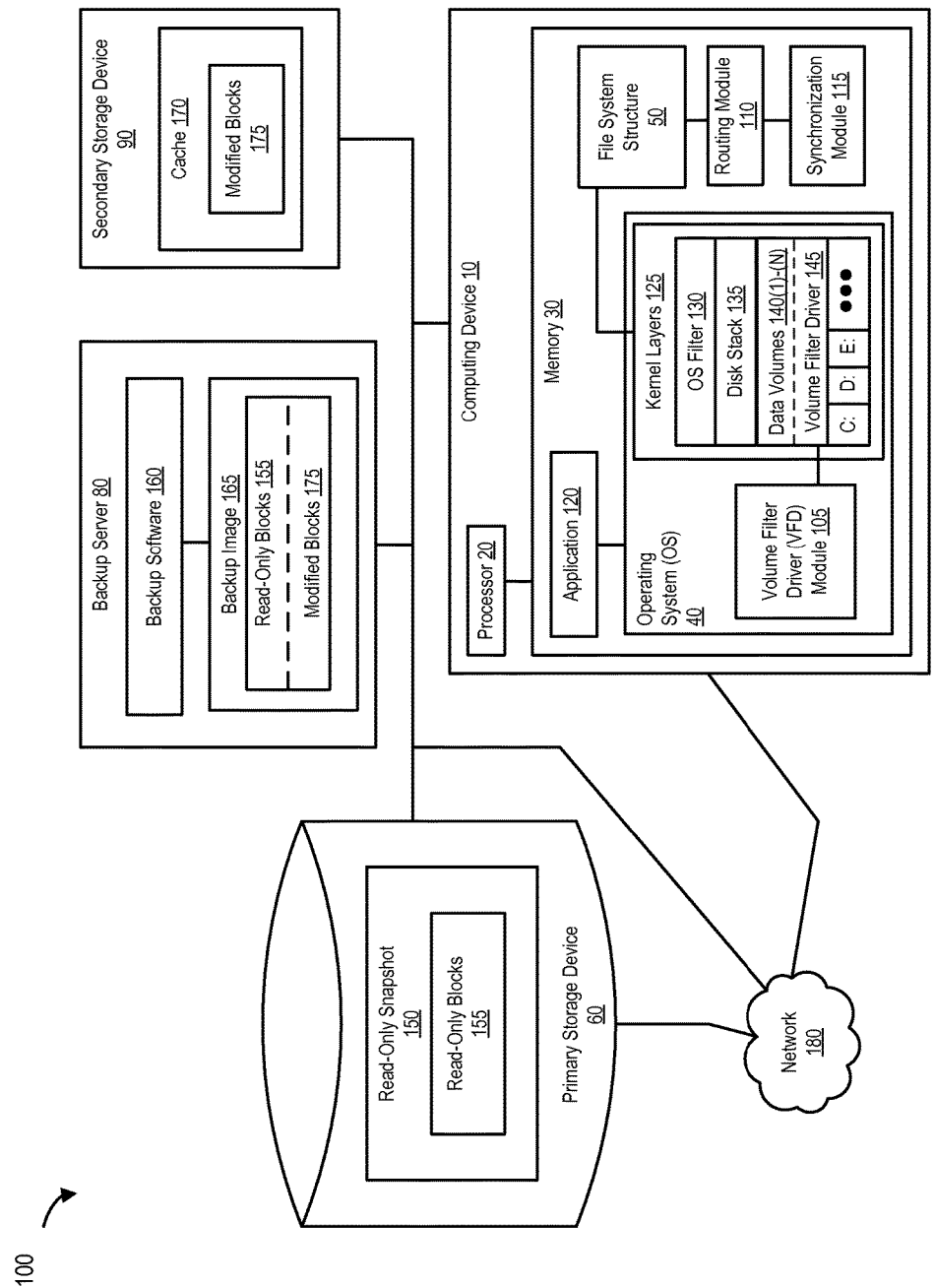
FIG. 1 is a block diagram of a computing system that implements a modifiable volume snapshot, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

In data backup and recovery, it can be useful to have the ability to modify backed up data before the data is actually saved (e.g., to a backup server). For example, a user may not require an entire storage disk or an entire data volume (e.g., particular volumes on a storage disk) to be backed up. Instead, the user may only be interested in permanently saving a particular subset of data within the aforementioned storage disk or data volume. In another example, a database administrator may decide that he or she may not want to reveal the contents of a particular data volume or certain confidential files within that data volume to all users for security purposes. In the foregoing example scenarios, which are by no means exhaustive, the user and the database administrator may wish to modify backup data before the backup data is actually saved.

In the context of snapshots, the ability to modify data in a snapshot, after the snapshot has been created, can be useful. For example, if a "gold copy" or a "master copy" of a disk image is deployed across multiple computers in a cluster (e.g., so that all the computers in the cluster can boot from the same point in the disk image), there may exist a need for the disk image to be updated with current antivirus definitions so that all the computers in the cluster have access to an up-to-date copy of the disk image, and consequently, the updated antivirus definitions. Therefore, the ability to modify backup data in a snapshot, after the snapshot has been created, but before the backup data in the snapshot can be saved (e.g., to a backup server), can be valuable for the purposes of data backup and recovery, among others.

Unfortunately, once a snapshot is created, a user may not be able to modify data within the snapshot (e.g., the contents of the snapshot). For example, after an operating system creates a snapshot of data in a data volume, the snapshot that is created is a read-only snapshot. Because a snapshot contains only pre-modification data (e.g., during a COW implementation), once created, the snapshot is rendered as a read-only object (e.g., for the purpose of data consistency as earlier described).

In addition, the creation of a snapshot not only requires a storage device to save backup data (e.g., COW data), but also requires the storage device to have knowledge about additional software layer(s) (e.g., a disk stack layer) which hide the complexity of the COW mechanism from upper layers of the operating system (e.g., an operating system filter) creating the snapshot (e.g., in the form of metadata). For example, to modify a snapshot, an operating system requires knowledge of a file system structure of a storage device on which the snapshot is stored so that the content of the snapshot can be modified. Therefore, the modification of a snapshot created by an operating system is dependent on the operating system having knowledge of (and being compatible with) the file system structure of the storage device.

If an operating system is incompatible with a file system structure used in allocating and managing storage in a storage device (e.g., NEW TECHNOLOGY FILE SYSTEM (NTFS), FILE ALLOCATION TABLE (FAT) etc.), then the operating system cannot perform modifications to a snapshot created by that operating system and stored on the storage device. Therefore, in addition to a snapshot being a read-only object, an operating system is further limited by being dependent on compatibility issues between the operating system and a file system structure associated with a storage device on which the operating system stores the snapshot created. Therefore, existing operating systems are unable to provide mechanisms for effectively modifying data in a snapshot, after the snapshot has been created.

Further, even if a scenario in which a window of time existed in which such changes could be made, such changes may not be effected in a reliable manner. One situation in which an operating system may provide some limited ability to modify the contents of a snapshot could be in the deletion of a file in a snapshot, after the snapshot's creation. However, because a snapshot takes very little time to create (e.g., typically just a few seconds), the time frame available to perform modification(s) to the contents of the snapshot is unusably (and unreliably) small. Given the large amounts of data stored in storage devices of modern enterprise environments, making modifications to the voluminous contents of a snapshot during this restrained time frame could result in timeout errors, partial changes, and other failures. The limited time available for snapshot modification after the creation of the snapshot, coupled with the read-only nature of the snapshot, and the dependency between the operating system creating the snapshot and knowledge of the file system structure of the storage device on which the snapshot is stored, prevents effective modification of snapshots after their creation.

Attaching a Volume Filter Driver

FIG. 1 is a block diagram of a computing system. This system includes a computing device 10, a primary storage device 60, a secondary storage device 90, and a backup server 80. As shown, computing device 10 is coupled to the primary storage device 60, secondary storage device 90, and backup server 80. Computing device 10 can be any of a variety of different types of computing devices, including a server, personal computing device, laptop computer, net book, personal digital assistant, cellular phone, or the like.

Computing device 10 includes a processor 20, and memory 30. Application 120, which for example, can be a Database Management System (DBMS), executes on computing device 10. Computing device 10 also includes an operating system (OS) 40 which includes, operating system layers (e.g., kernel layers 125), among others, such as, an OS filter 130, a disk stack 135, and also includes data volumes 140(1)-(N) which are shown as volumes C:, D:, E:, etc. It is noted that this is a simplified example, and that other embodiments can include far more complex organizational and configuration schemes with a greater number of OS layers than are shown here.

Computing device 10 is coupled to primary storage device 60. In this example, primary storage device 60 stores a read-only snapshot 150, but can also store data in other formats (not shown). Primary storage device 60 can be a persistent storage device and can include one or more of a variety of different storage devices, including hard disks, compact discs, digital versatile discs, solid state drive (SSD) memory such as flash memory, and the like, or one or more logical storage devices such as volumes implemented on one or more such physical storage devices. Primary storage device 60 is described as providing persistent storage because data stored on primary storage device 60 can be maintained (e.g., for a non-negligible time, such as several minutes, hours, days, years, and so on), even if power to primary storage device 60 and/or to a drive that reads and writes to primary storage device 60 is interrupted or cycled off for a non-negligible time.

Computing device 10 is also coupled to a secondary storage device 90. In this example, secondary storage device 90 can be a SSD such as Flash memory, or even a file, and is useful for implementing cache 170 so that data (e.g., frequently accessed data) can be served to application 120 in an expeditious manner, versus, for example, from a slower storage device which may use a hard disk drive (HDD). However, secondary storage device 90 can include one or more of a variety of different storage devices, including hard disks, compact discs, digital versatile discs, and the like, or one or more logical storage devices such as volumes implemented on one or more such physical storage devices.

Because application data in a modern application (e.g., application 120) can include very large amounts of data (e.g., in terms of gigabytes, terabytes, or more), and because a user can specify large portions (or even all of) application data to be processed in a given database operation, extremely large amounts of data may be included at a given time. Because storage devices such as primary storage device 60 are often, due to reasons of cost, reliability, and the like, unable to provide as high access performance as other types of storage devices, the time needed to access data on such a persistent storage device is often a limiting factor. Accordingly, many systems use a storage device that can be accessed more quickly to temporarily cache the portions of the application data that are currently needed by the application in order to improve application performance. Here, cache 170 is implemented on such a device, which in this example, is secondary storage device 90.

Computing device 10 and primary storage device 60 can be integrated (e.g., where the persistent storage device is coupled to the node's internal processing devices by an internal bus and is built within the same chassis as the rest of the node) or separate. If separate, computing device 10 and primary storage device 60 can be coupled by a local connection (e.g., using a technology such as Bluetooth™, Peripheral Component Interconnect (PCI), Small Computer System Interface (SCSI), or the like) or (as shown in this example) via one or more networks 180 such as the Internet or a storage area network.

In this example, computing device 10 implements a file system structure 50. File system structure 50 is software and data structures that organize and control access to data (e.g., in the form of files). Here, file system structure 50 controls access to files used by application 120 stored on primary storage device 60 (e.g., application data). File system structure 50 maintains metadata that identifies each file (e.g., by a file name), as well as each file's location on primary storage device 60, each file's size, and other information such as the file's creation time, more recent access time, and the like. Such information can be maintained in an inode structure for certain types of file system structures.

The term "file system structure" can refer to both the software (which itself can be part of an operating system or database) that organizes the files and the collection of files that are organized by that application. Files can be organized hierarchically, with directories collecting groups of files and/or other directories. A file system such as file system structure 50 can provide another application, such as a DBMS application, with access to files (e.g., the ability to open, read, modify, create, delete, and otherwise interact with the data within the files).

A file system application also tracks the manner in which its files map to the blocks of data within the primary storage volume in file system metadata. This way, when an application such as a database application requests access to a particular file (e.g., using the file name of the file), the file system can translate that request into a request for the particular blocks of data included in the requested file. Accordingly, the file system application maintains information as to which blocks of data in primary storage device 60 belong to each file. For example, this information (based on file system metadata maintained by the file system structure) allows file system structure 50, routing module 110, and synchronization module 110 (in conjunction with volume filter driver module 105) to selectively intercept and route write transactions intended for data in read-only snapshot 150 to another storage device (e.g., secondary storage device 90), and also allows for a read transaction to be served from different storage devices (e.g., depending on whether the read transaction seeks previously-modified data).

A storage stack is a bundled software product that includes computing devices, servers, networking components, and other software such as virtualization software. When a storage stack like the one shown in FIG. 1 is initially set up, OS 40 loads all drivers necessary for the various storage devices that are used by the storage stack (e.g., primary storage device 60, secondary storage device 90, etc.). These drivers include disk drivers, volume drivers, partition drivers, file system drivers, etc. The storage stack shown in FIG. 1, includes volume filter driver 145 which is implemented by volume filter driver module 105.

A volume filter driver (also called an upper volume filter), is software that understands, interprets, and translates the function of a driver associated with a lower software layer (e.g., volume drivers associated with data volumes 140(1)-(N)) to a driver associated with an upper software layer (e.g., drivers associated with OS filter 130, file system structure 50, etc.). To filter a data volume, a volume filter driver creates a filter device object (not shown in FIG. 1) and attaches the filter device object above the volume device object for the data volume (also not shown in FIG. 1). In this example, volume filter driver 145 filters input/output (I/O) requests from the lower software layer, and passes the I/O requests to the upper software layer, after adding one or more values to the I/O request (e.g., after performing a computing function).

One type of value addition by volume filter driver 145, among others, can include data encryption. For example, if data volume C: (as shown in FIG. 1) requires I/O operations to be encrypted, and OS filter 130, which helps application 120 access data volume C: requires I/O operations to be decrypted, volume filter driver 145 can sit in-between OS filter 130 and data volume C: and can perform both encryption and decryption of I/O operations. Therefore, the encrypted status of data volume C: is invisible (and agnostic) to the software (and a user) accessing data volume C: (e.g., a user using application 120). In a similar manner, a volume filter driver can intercept and route modifications intended for data in a read-only snapshot, after the read-only snapshot has been created, for example, by a service provided by an operating system (e.g., VSS).

In one embodiment, a volume filter driver (e.g., volume filter driver 145) is attached to a snapshot volume (e.g., data volume C:) on a primary storage device (e.g., primary storage device 60) after a snapshot of data in the data volume is taken (e.g., read-only snapshot 150). It should be noted that snapshot data may reside on a storage device or entity other than the primary storage device. In this example, attaching the volume filter driver refers to connecting the volume filter driver into the communication path of a disk stack (e.g., disk stack 135) to intercept I/O operations. One or more modifications intended for data in read-only snapshot 150 is then detected, where the read-only snapshot 150 is stored on primary storage device 60. Upon detecting the modification(s) intended for data in read-only snapshot 150 (e.g., from application 120), a write operation (also called a write transaction, or simply a write), which includes the modification(s), is performed to secondary storage device 90, instead of primary storage device 60. Volume filter driver 145 intercepts and routes the modifications(s) to secondary storage device 90 (e.g., because read-only snapshot 50 is a read-only object and cannot be modified, as discussed above).

In some embodiments, volume filter driver 145 only includes one driver binary in memory 30. In this example, a separate and new instance of volume filter driver 145 can be created for and attached to each data volume. Therefore, although only one physical copy of volume filter driver 145 exists, separate instances of volume filter driver 145 can be mapped to each process that utilizes a volume filter driver (e.g., data volume C: which is being written to, and data volume D: which is being read from, etc.). However, in other embodiments, more than one physical copy of a volume filter driver may be implemented to be shared among various data volumes (even to the point of 1:1 relationships), or to perform more complex processes (e.g., data encryption or decryption as described above). For example, and in certain embodiments, each data volume can have a dedicated volume filter driver attached to the data volume, to perform one or more dedicated tasks or processes.

Intercepting and Routing Modification(s) Intended for Read-Only Snapshot

Figure 2A:
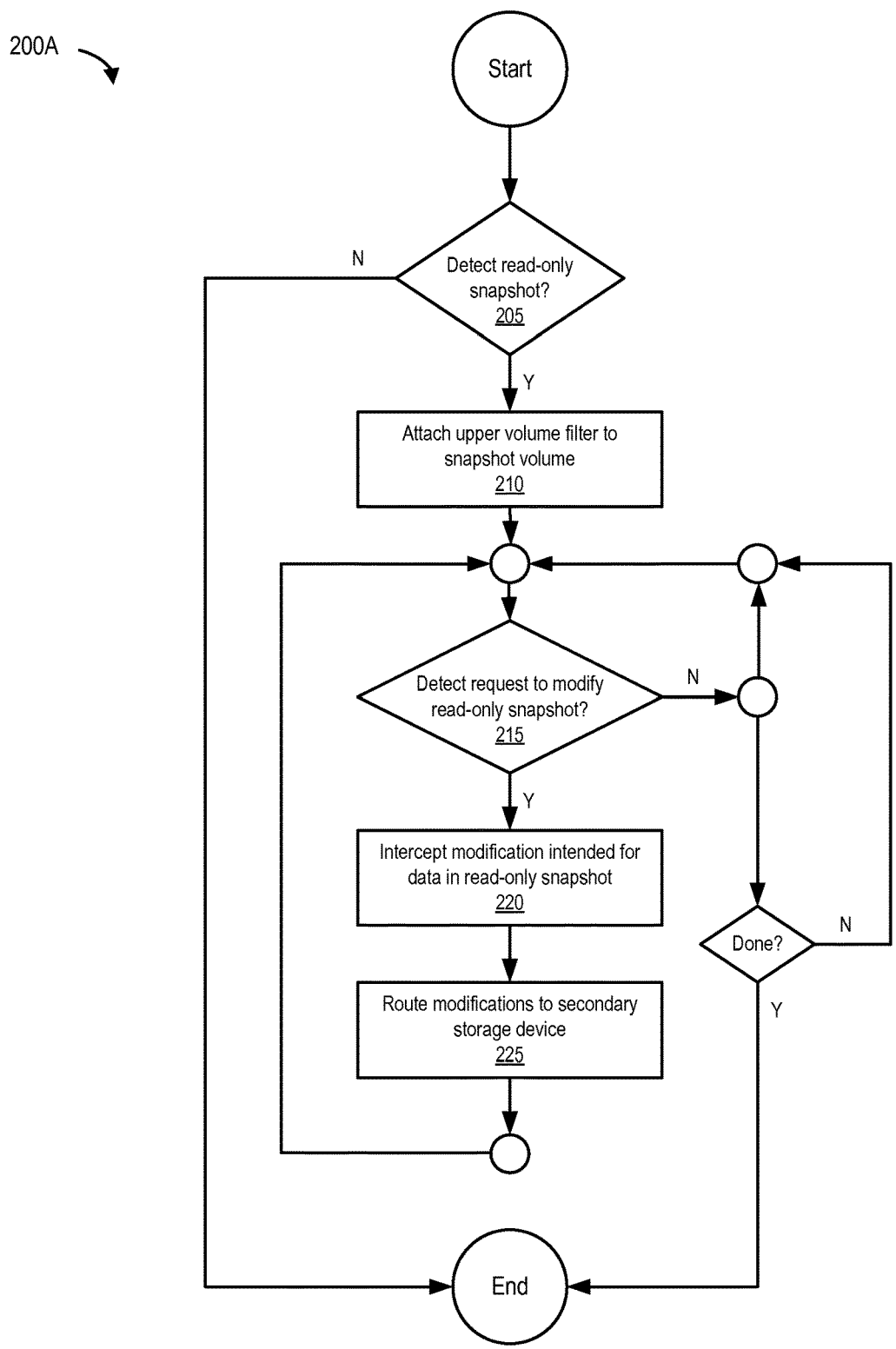
FIG. 2A is a flowchart of a process of intercepting and routing modification(s) intended for a snapshot to a secondary storage device, according to one embodiment of the present invention.

FIG. 2A is a flowchart of a process of intercepting and routing modification(s) intended for data in a read-only snapshot to a secondary storage device, according to one embodiment of the present invention. The process begins at 205 by detecting a read-only snapshot. If the process detects a read-only snapshot, at 210, the process attaches an upper volume filter (e.g., volume filter driver 145) to a snapshot volume of the read-only snapshot. At 215, the process detects a request to modify data in the read-only snapshot. If the request to modify the data contents of the read-only snapshot is detected, the process, at 220, uses volume filter driver 145 to intercept modification(s) intended for data in the read-only snapshot. The process ends at 225 by routing modification(s) to the secondary storage device.

At the end of a typical snapshot process, an operating system (e.g., OS 40 as shown in FIG. 1, Windows™ 7, iOS™, Linux™, or any other operating system), uses a snapshot provider (e.g., VSS) to create a read-only copy of a data volume (e.g., data volume 140(1)). An OS snapshot function mechanism facility (e.g., like VSS), works on the volume level and can take a snapshot of one or more data volumes. After creating the read-only snapshot, the operating system returns a handle (e.g., an abstract reference to a resource used when an application references objects managed by an OS) to this read-only snapshot. The handle is used by backup software (e.g., backup software 160 as shown in FIG. 1) to create a backup image (e.g., backup image 165 as shown in FIG. 1).

It will be appreciated that although the read-only snapshot is a read-only construct (e.g., a read-only object), the volume filter driver provides the ability (e.g., to application 120) to perform both read and write transactions. Once the volume filter driver is attached to the read-only snapshot, the volume filter driver monitors read and write transactions that are intended for and/or associated with data in the read-only snapshot. As discussed above, to filter a data volume, a volume filter driver creates a filter device object and attaches the filter device object (e.g., volume filter driver 145) above the volume device object for the data volume. In this example, the filter device object created by the volume filter driver is a writeable (filter device) object.

Because the volume filter driver provides a writeable software layer in the form of the filter device object, the volume filter driver "exposes" this writeable filter device object to the backup software by returning a handle. Exposing in this context refers to creating a separate disk stack for the writeable filter device object (e.g., a writeable volume-type object) created by the volume filter driver, and instantiating this writeable filter device object within the OS. By doing so, the file system structure of the OS can use the writeable filter device object to (successfully) perform a write transaction intended for data in the read-only snapshot. In one embodiment, the write transaction is performed by using file system application programming interfaces (APIs). In this example, "exposing" means that the read-only snapshot is accessible for the purposes of modification (e.g., through a write transaction) to software components (e.g., to the writeable filter device object created by the volume filter driver, application 120, etc.) other than the one which created the read-only snapshot (e.g., the VSS).

Creating a Backup Image with Modification(s) Intended for Read-Only Snapshot

Figure 2B:
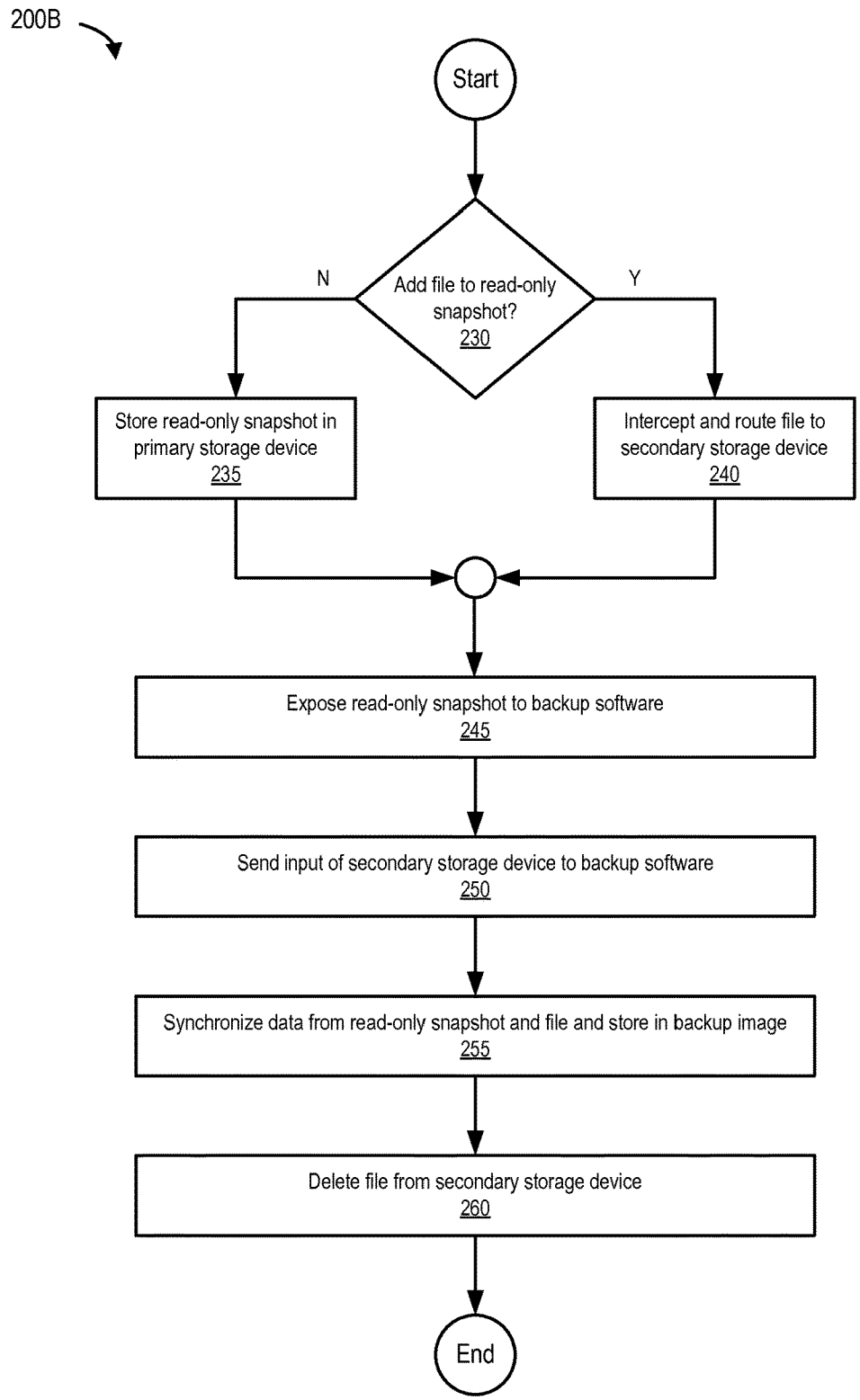
FIG. 2B is a flowchart of a process synchronizing data from a read-only snapshot and modification(s) intended for the read-only snapshot, according to one embodiment of the present invention.

FIG. 2B is a flowchart of a process creating a backup image which includes files intended for a read-only snapshot, according to one embodiment of the present invention. The process begins at 230 by determining whether a user wants to add a file to a data volume associated with a read-only snapshot. If the user does not want to add a file to a data volume associated with the read-only snapshot, at 235, the read-only snapshot is stored in primary storage device 60. However, if the user does want to add a file to a data volume associated with the read-only snapshot, at 240, the process intercepts and routes the file to secondary storage device 90 (e.g., by using volume filter driver 145).

At 245, the process exposes the read-only snapshot to backup software 160. As discussed above, exposing the read-only snapshot to backup software involves using volume filter driver 145 to create a separate disk stack (not shown in FIG. 1) for the read-only snapshot that is a writeable filter device object, and also involves mounting the writeable filter device object within the OS (e.g., so that the writeable filter device object is accessible by file system structure 150 for performing modifications intended for data in the read-only snapshot). The process, at 250, sends (or transmits) the input of secondary storage device 90 to backup software 160, and at 255, synchronizes data from read-only snapshot 150 and the file (which is stored in secondary storage device 90) and stores the synchronized data in backup image 165. The process ends at 260 by deleting the file from secondary storage device 90 (e.g., because the file is already a part of backup image 165 and is backed up on backup server 80).

As shown in FIG. 1, backup software 160 executes on backup server 80. In this example, backup server 80 is a backup storage device and can be included within and/or coupled to (e.g., via a bus, network, or other appropriate interconnect) computing device 10. Backup server 80 provides persistent data storage, such that data stored on such a device will remain stored even after the storage device is powered off. Such a storage device can be, for example, a hard disk, a compact disk (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storages and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tapes).

If should also be noted that in some embodiments, backup software 160 stores data as a unit of blocks. Therefore, as shown in FIG. 1, read-only snapshot 150 includes read-only blocks 155, cache 170 includes modified blocks 175, and backup image 165 includes both read-only blocks 155 and modified blocks 175 (e.g., because of synchronization of data in primary storage device 60, which is read-only, and data in secondary storage device 90, which includes one or more write transactions with modification(s) intended for data in read-only snapshot 150). In other embodiments, backup software 160 can store data in various other subdivisions and/or data structures.

Serving Data after Modifications(s) Intended for Read-Only Snapshot

Figure 2C:
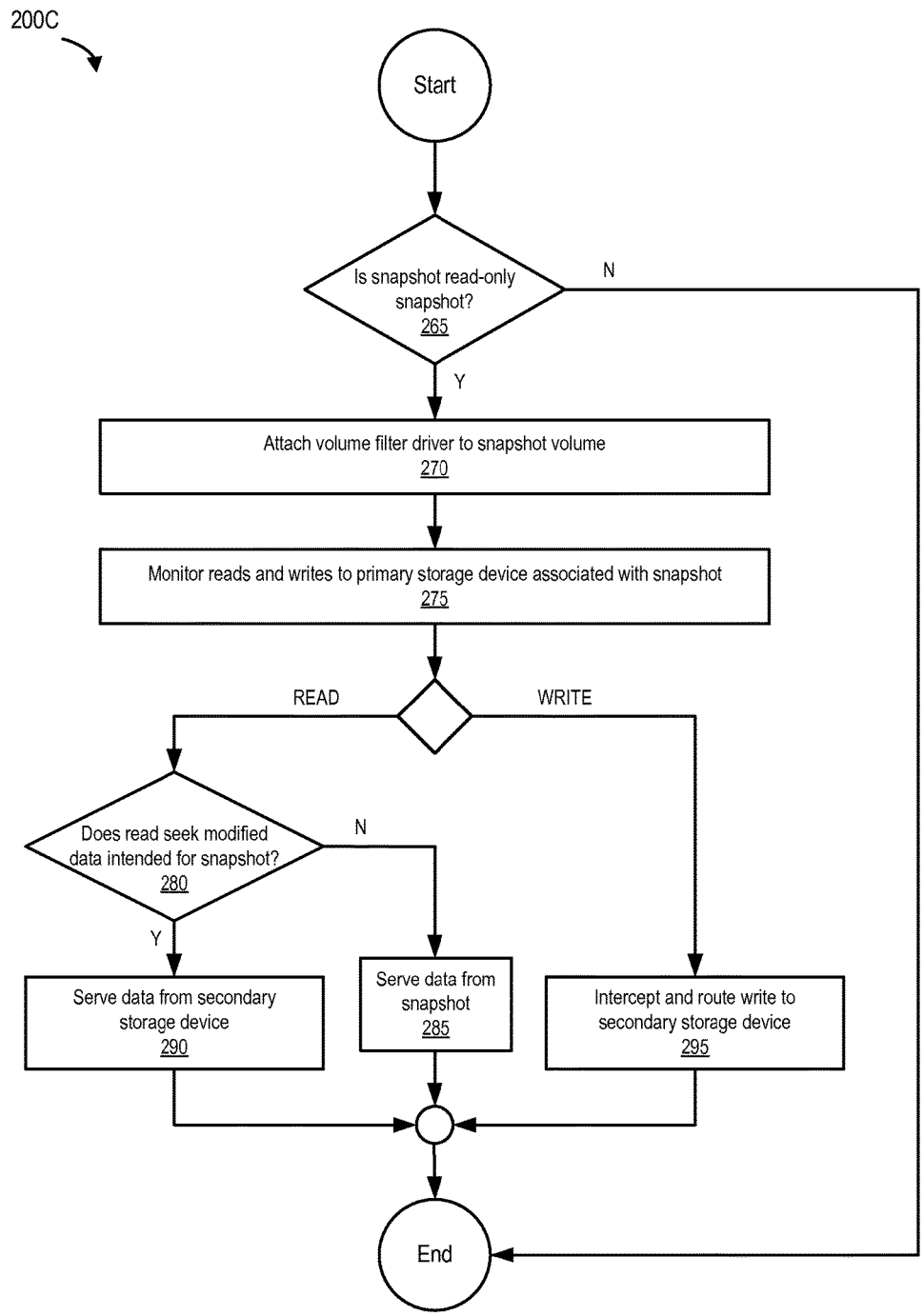
FIG. 2C is a flowchart of a process of attaching a volume filter driver to a snapshot and subsequently serving data from a storage device, according to one embodiment of the present invention.

FIG. 2C is a flowchart of a process of serving modified data intended for a read-only snapshot, according to one embodiment of the present invention. The process begins at 265 by determining whether a snapshot that is taken, for example, by a snapshot provider of an OS, is a read-only snapshot. If the snapshot that is taken is a read-only snapshot, the process at 270 attaches a volume filter driver to the snapshot volume. As noted above, to filter a data volume, the volume filter driver creates a filter device object, which, according to one or more embodiments, is a writeable volume-type object. At 275, the volume filter driver, by virtue of implementing a writeable device filter object, monitors read and write transactions to primary storage device 60 (e.g., from application 120), which, according to some embodiments, stores read-only snapshot 150. It should be noted that the read-only snapshot, being read-only, is thus incapable of being modified by the write transaction.

At 280, the process determines if the read transaction seeks modified data that was intended for the read-only snapshot. If a read transaction does not seek modified data intended for the read-only snapshot, the process, at 285, serves the read transaction from the read-only snapshot. On the other hand, if the read transaction does seek modified data intended for the read-only snapshot, the process, at 290, serves the read transaction from secondary storage device 90, which, as discussed above, stores modification(s) intended for the read-only snapshot by virtue of the interception and routing performed by volume filter driver 145 (e.g., see FIGS. 2A and 2B). However, if the volume filter driver detects a write transaction, which, by definition, seeks to modify data, the process, at 295, intercepts and routes write transaction (with the intended modification(s)) to secondary storage device 90.

Using a Bitmap to Track Modification(s) Intended for Read-Only Snapshot

A bitmap is a non-sequential data structure that stores information identifying changed blocks of data, for example, within a data cluster. Each bit in a bitmap represents a region of a primary volume (e.g., data volume 140(1)), and the value of each bit indicates whether that region has been modified or not. A bitmap can be used to track modification(s) (e.g., in the form of a write transaction) to a data volume, initiated, for example, by an application (e.g., application 120).

It will be appreciated that volume filter driver 145, in conjunction with volume filter driver module 105, maintains a bitmap in the volume filter layer (e.g., the software layer that implements the writeable filter device object). It should be noted that the bitmap referenced herein is separate from and can be in addition to bitmaps maintained by the operating system or file system structure, and can be maintained in various other locations, for example, in cache 175, or on a separate storage device. In one embodiment, when application 120 makes a modification (e.g., through a write transaction) intended for data in the read-only snapshot, the bitmap is marked (e.g., the value of a bit in the bitmap is changed, for example, from zero (0) to one (1)). Therefore, the bitmap tracks modifications intended for data in the read-only snapshot by changing the value of a bit within the bitmap which indicates whether that region of data has been modified or not.

Figure 3A:
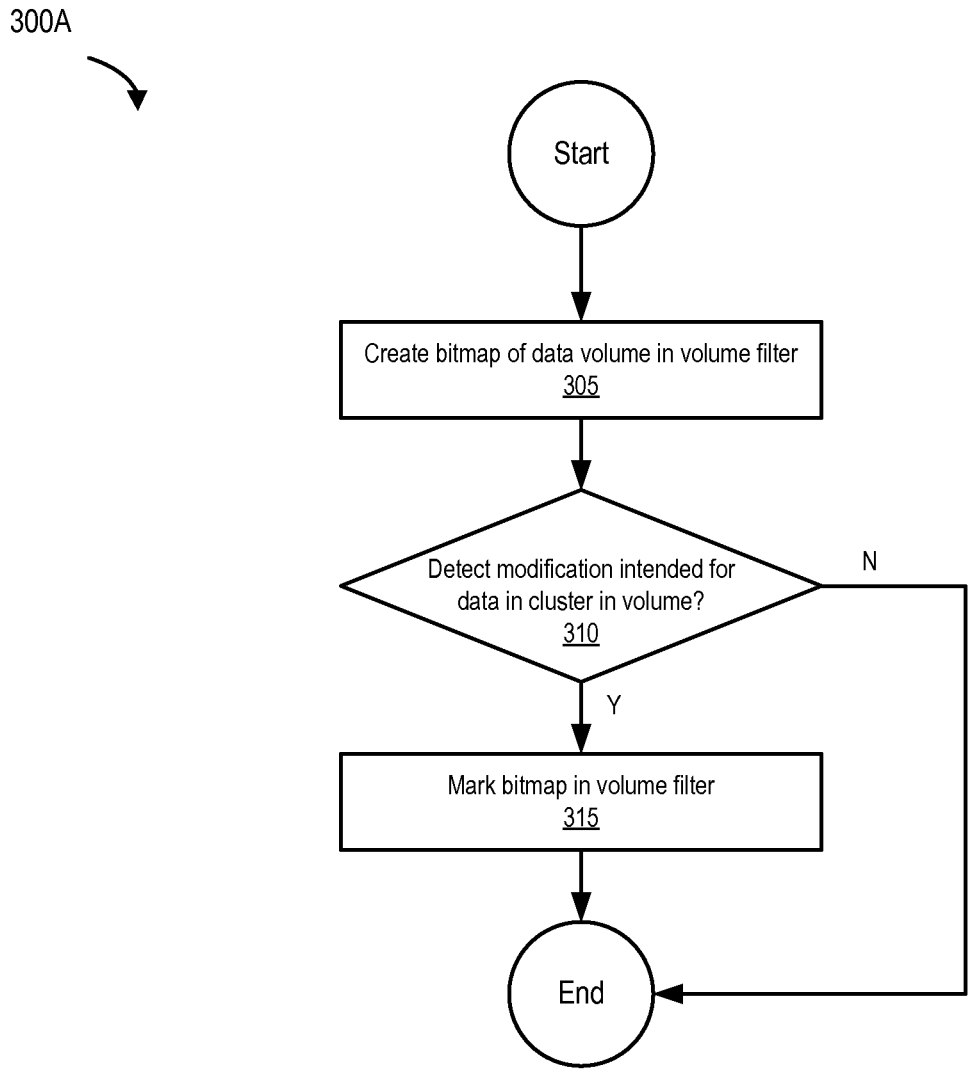
FIG. 3A is a flowchart of a process of maintaining a bitmap of a disk volume in a volume filter, according to one embodiment of the present invention.

FIG. 3A is a flowchart of a process of maintaining a bitmap of one or more data volumes in a volume filter, according to one embodiment of the present invention. The process begins at 305 by maintaining a bitmap of data volumes 140(1)-(N) in the volume filter layer (e.g., the software layer below disk stack 135 as shown in FIG. 1). At 310, the process detects modification(s) intended for data blocks within a data cluster of the data volume (e.g., data volume 140(1)). If modification(s) are detected, the process ends at 315 by marking the bitmap in the volume filter tracking the modification(s) intended for data in the read-only snapshot, which, as discussed above, are intercepted and routed to secondary storage device 90 by volume filter driver 145. In this manner, the bitmap keeps track of modification(s) intended for data in the read-only snapshot, that are intercepted and stored separately, for example, as modified blocks 175 on cache 170.

In one embodiment, if a read transaction seeks previously modified data (e.g., modification(s) that were intended for a cluster in a data volume that have been intercepted and routed to secondary storage device 90 by volume filter driver 145), the bitmap is checked to see if application 120 has previously made a modification (e.g., to that particular cluster in the data volume). If that particular cluster has been previously modified, the read transaction will not be furnished from primary storage device 60. Instead, and in some embodiments, the read transaction will be served from the cached copy (e.g., from modified blocks 175 in secondary storage device 90 which caches and stores such modification(s)). In other embodiments, if the bitmap indicates that the requested data has not been modified by application 120, then the read transaction is served from primary storage device 60 (e.g., from read-only blocks 155).

Figure 3B:
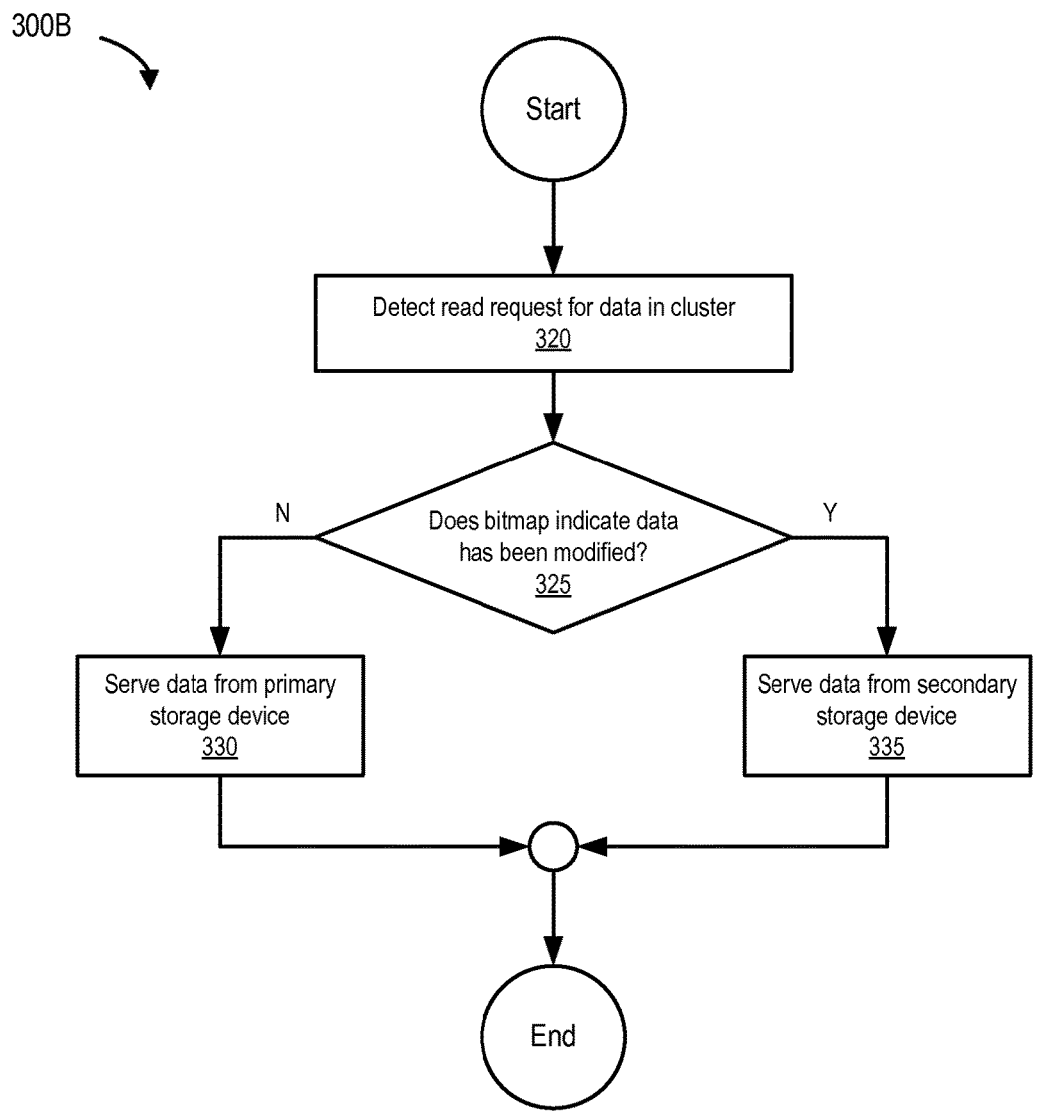
FIG. 3B is a flowchart of a process of serving data from a storage device based on a bitmap, according to one embodiment of the present invention.

FIG. 3B is a flowchart of a process of serving data based on a bitmap tracking changes to modification(s) intended for data in a read-only snapshot, according to one embodiment of the present invention. The process begins at 320 by detecting a read request for data in a data cluster on a data volume. At 325, the process determines if the bitmap indicates that data blocks associated with the data cluster on the data volume have been modified (e.g., whether the modification(s) have been previously been intercepted and routed to secondary storage device 90 by volume filter driver 145). If the read requests data which has not been previously modified (e.g., if the bitmap value for that particular data block indicates a zero (0), the process, at 330, serves the read request from primary storage device 60 (e.g., from read-only blocks 155). On the other hand, if the read requests data which has been modified (e.g., if the bitmap value for that particular data block indicates a one (1)), the process, at 335, serves the read request from secondary storage device 90 (e.g., from modified blocks 175).

Embodiments of Backup Processes

As noted above, backup server 80 executes backup software 160. In will be appreciated that in some embodiments, backup software 160 is agnostic to file system structure 50 executing on computing device 10 by virtue of volume filter driver 145 operating at a volume level (e.g., the writeable volume filter level) of OS 40 executing on computing device 10.

On a typical computing device, when a volume device (e.g., data volumes 140(1)-(N)) associated with the computing device is exposed by an operating system executing on the computing device, the operating system automatically mounts a file system structure on the volume device. For example, if a volume device is exposed by Windows™ 7, Windows™ 7 uses several available drivers such as NTFS, FAT, etc. to probe and claim the volume device. For example, if a volume device is FAT-compatible, the FAT driver claims the volume device and mounts a FAT-compatible file system structure on that volume device.

However, by virtue of operating at the volume level (e.g., below file system structure 50), volume filter driver 145 does not need knowledge of the complexities of the layout of a file system structure because the OS performs the task of managing the file system structure. Because application I/O operations are sent through the file system structure to the volume level, the attachment of volume filter driver 145 provides an abstraction layer that ensures that volume filter driver 145 needs no knowledge of the file system structure, and can thus bypass understanding the logic of a particular file system structure.

Therefore, by providing an abstraction layer between a file system structure and data volumes, application 120 sees a read-only snapshot as a writeable data volume, and has no indication that modification(s) intended for data in the read-only snapshot have been intercepted and routed to secondary storage device 90. To application 120 (and to a user using application 120), data volumes associated with read-only snapshot 150, despite being a read-only object, appear as data volumes that are both readable and writeable.

Figure 4:
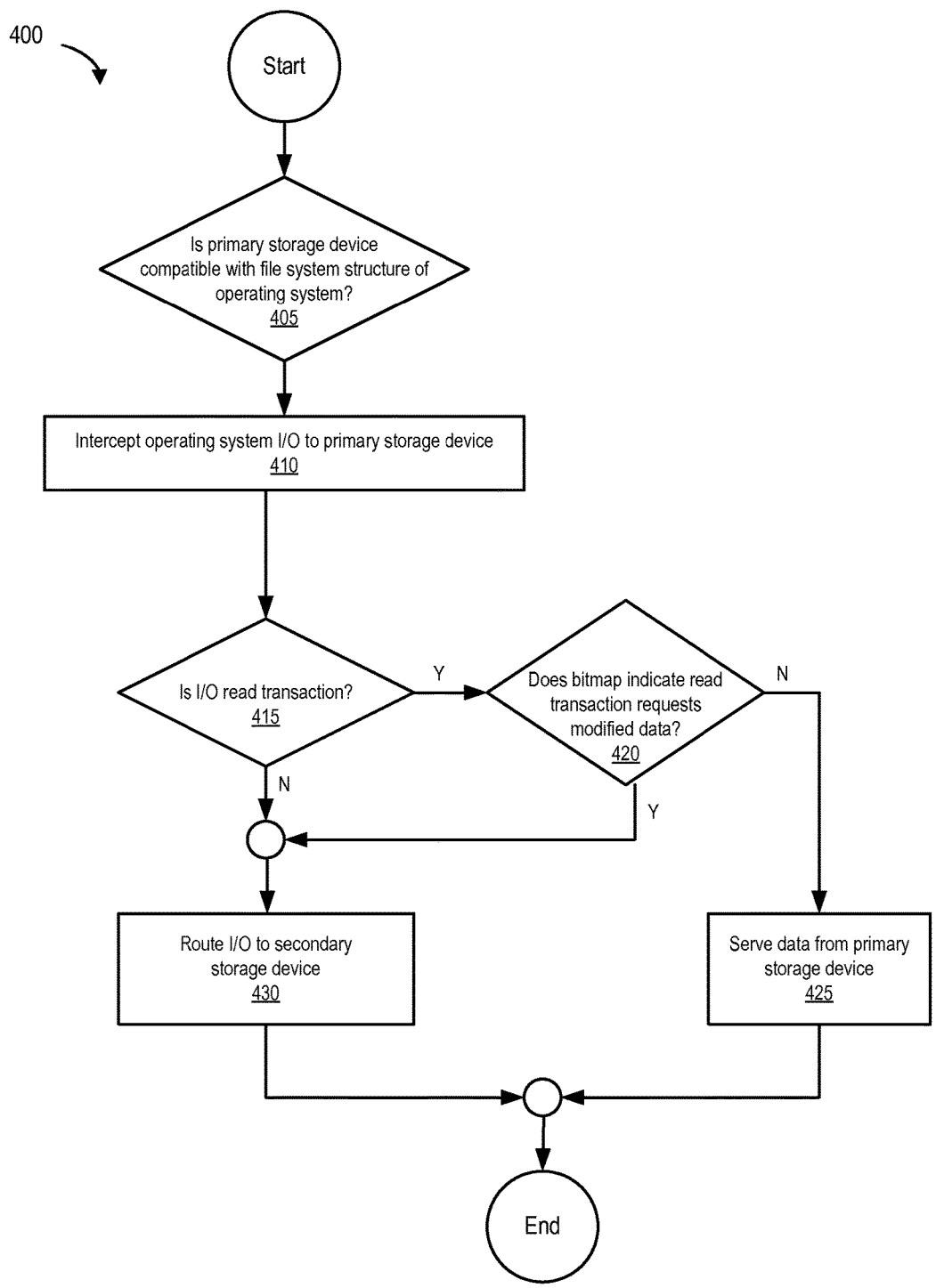
FIG. 4 is a flowchart of a process of servicing a read transaction from a storage device, according to one embodiment of the present invention.

FIG. 4 is a flowchart of a process of bypassing the logic of a file system structure, according to one embodiment of the present invention. The process begins at 405 by determining whether primary storage device 60 is compatible with file system structure 50 of OS 40. If compatibility is found, the process, at 410, intercepts OS I/Os to primary storage device 60 (e.g., to read-only snapshot 150). At 415, the process determines if the I/O is a read transaction. If the I/O is a read transaction, the process, at 420, determines if the bitmap indicates whether the read transaction requests modified data. If the bitmap indicates that the read transaction does not request modified data, the process, at 425, serves data from primary storage device 60. However, if the bitmap indicates that the read transaction requests modified data, the process, at 430, routes the I/O to secondary storage device 90 (e.g., serves the read transaction from modified blocks 175 stored in cache 170).

It will be appreciated that by operating at a software level below a file system structure and by bypassing the logic of the file system structure, modification(s) may be made to data in a snapshot after the snapshot is created, and before the data is actually backed up (e.g., to the backup server). In addition, by only modifying and backing up user and application data, and not operating system data, some amount of storage savings may also be realized. Further, a user may be able to backup only certain files or folders which are important to that user, the user may be able to mask off certain sensitive files from a backup, and/or the user may be able to fuse/insert the latest antivirus definitions and/or drivers directly into a backup image at the time of backup.

Example Computing Environment

Figure 5:
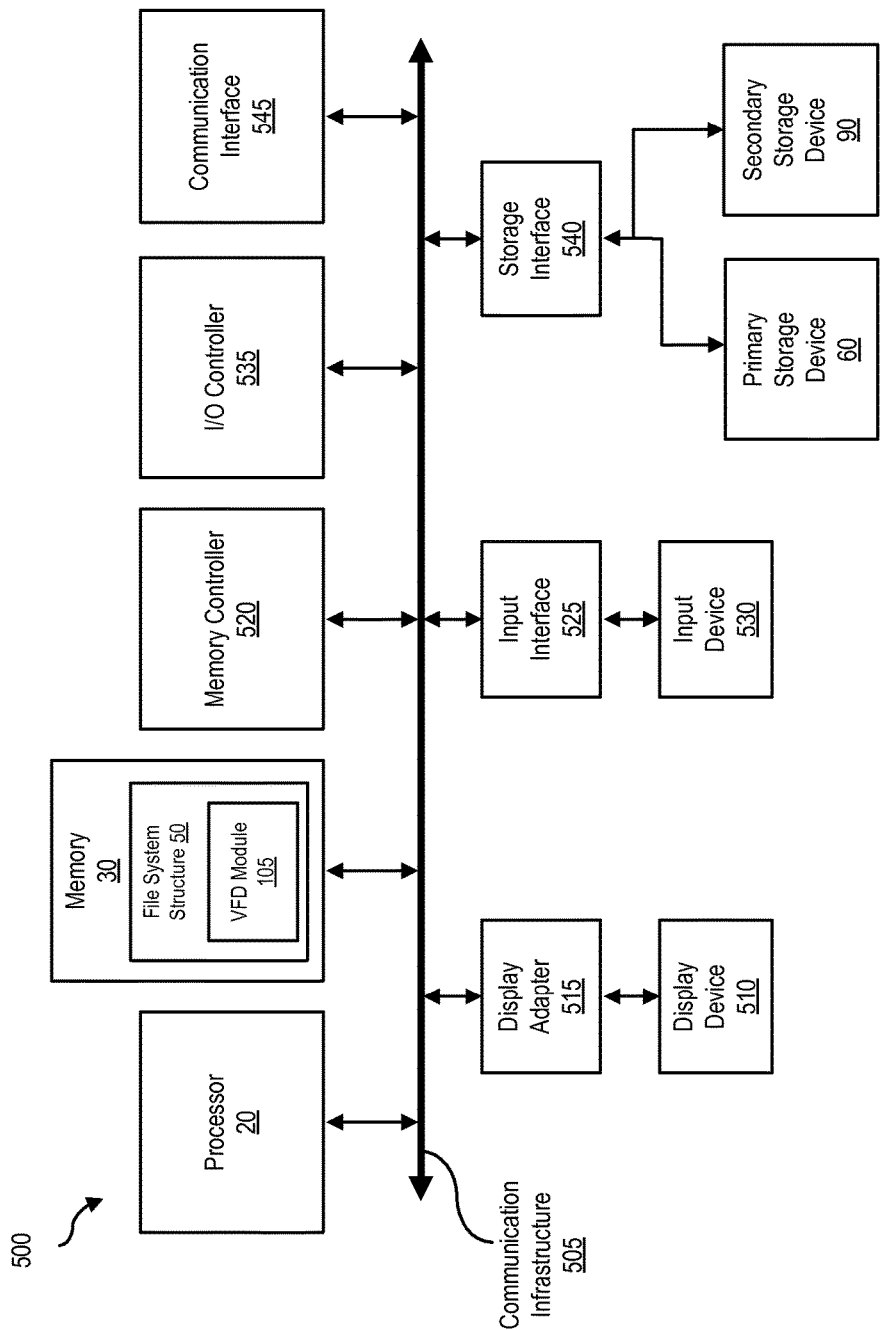
FIG. 5 is a block diagram of a computing device, illustrating how a volume filter driver module can be implemented in software, according to one embodiment of the present invention.

FIG. 5 is a block diagram of a computing system 500 capable of implementing computing device 10 and/or backup server 80 as described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 20 and a memory 30. By executing the software that implements computing device 10 and/or backup server 80, computing system 500 becomes a special purpose computing device that is configured to perform modifiable volume snapshots.

Processor 20 generally represents any type or form of processing unit capable of processing data or interpreting and executing instructions. In certain embodiments, processor 20 may receive instructions from a software application or module. These instructions may cause processor 20 to perform the functions of one or more of the embodiments described and/or illustrated herein. For example, processor 20 may perform and/or be a means for performing all or some of the operations described herein. Processor 20 may also perform and/or be a means for performing any other operations, methods, or processes described and/or illustrated herein.

Memory 30 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 500 may include both a volatile memory unit and a non-volatile storage device. In one example, program instructions implementing a modifiable volume snapshot operation may be loaded into memory 30.

In certain embodiments, computing system 500 may also include one or more components or elements in addition to processor 20 and memory 30. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type or form of device capable of handling memory or data or controlling communication between one or more components of computing system 400. For example, in certain embodiments memory controller 520 may control communication between processor 20, memory 30, and I/O controller 535 via communication infrastructure 505. In certain embodiments, memory controller 520 may perform and/or be a means for performing, either alone or in combination with other elements, one or more of the operations or features described and/or illustrated herein.

I/O controller 535 generally represents any type or form of module capable of coordinating and/or controlling the input and output functions of a computing device. For example, in certain embodiments I/O controller 535 may control or facilitate transfer of data between one or more elements of computing system 400, such as processor 20, memory 30, communication interface 545, display adapter 515, input interface 525, and storage interface 540.

Communication interface 545 broadly represents any type or form of communication device or adapter capable of facilitating communication between computing system 500 and one or more additional devices. For example, in certain embodiments communication interface 545 may facilitate communication between computing system 500 and a private or public network including additional computing systems. Examples of communication interface 545 include, without limitation, a wired network interface (such as a network interface card), a wireless network interface (such as a wireless network interface card), a modem, and any other suitable interface. In at least one embodiment, communication interface 545 may provide a direct connection to a remote server via a direct link to a network, such as the Internet. Communication interface 545 may also indirectly provide such a connection through, for example, a local area network (such as an Ethernet network), a personal area network, a telephone or cable network, a cellular telephone connection, a satellite data connection, or any other suitable connection.

In certain embodiments, communication interface 545 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 545 may also allow computing system 500 to engage in distributed or remote computing. For example, communication interface 545 may receive instructions from a remote device or send instructions to a remote device for execution.

As illustrated in FIG. 5, computing system 500 may also include at least one display device 510 coupled to communication infrastructure 505 via a display adapter 515. Display device 510 generally represents any type or form of device capable of visually displaying information forwarded by display adapter 515. Similarly, display adapter 515 generally represents any type or form of device configured to forward graphics, text, and other data from communication infrastructure 505 (or from a frame buffer, as known in the art) for display on display device 510.

As illustrated in FIG. 5, computing system 500 may also include at least one input device 530 coupled to communication infrastructure 505 via an input interface 525. Input device 530 generally represents any type or form of input device capable of providing input, either computer or human generated, to computing system 500. Examples of input device 530 include, without limitation, a keyboard, a pointing device, a speech recognition device, or any other input device.

As illustrated in FIG. 5, computing system 500 may also include a primary storage device 60 and a secondary storage device 90 coupled to communication infrastructure 505 via a storage interface 540. Primary storage device 60 and secondary storage device 90 generally represent any type or form of storage devices or mediums capable of storing data and/or other computer-readable instructions. For example, primary storage device 60 and secondary storage device 90 may include a magnetic disk drive (e.g., a so-called hard drive), a floppy disk drive, a magnetic tape drive, an optical disk drive, a flash drive, or the like. Storage interface 540 generally represents any type or form of interface or device for transferring and/or transmitting data between primary storage device 60, secondary storage device 90, and other components of computing system 500.

In certain embodiments, primary storage device 60 and secondary storage device 90 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Primary storage device 60 and secondary storage device 90 may also include other similar structures or devices for allowing computer software, data, or other computer-readable instructions to be loaded into computing system 500. For example, primary storage device 60 and secondary storage device 90 may be configured to read and write software, data, or other computer-readable information. Primary storage device 60 and secondary storage device 90 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 400 for storage in memory via a network such as the Internet or upon a carrier medium.

The computer-readable medium containing the computer program may be loaded into computing system 400. All or a portion of the computer program stored on the computer-readable medium may then be stored in memory 15 and/or various portions of storage 45. When executed by processor 85, a computer program loaded into computing system 400 may cause processor 85 to perform and/or be a means for performing the functions of one or more of the embodiments described and/or illustrated herein. Additionally or alternatively, one or more of the embodiments described and/or illustrated herein may be implemented in firmware and/or hardware. For example, computing system 400 may be configured as an application specific integrated circuit (ASIC) adapted to implement one or more of the embodiments disclosed herein.

Example Networking Environment

Figure 6:
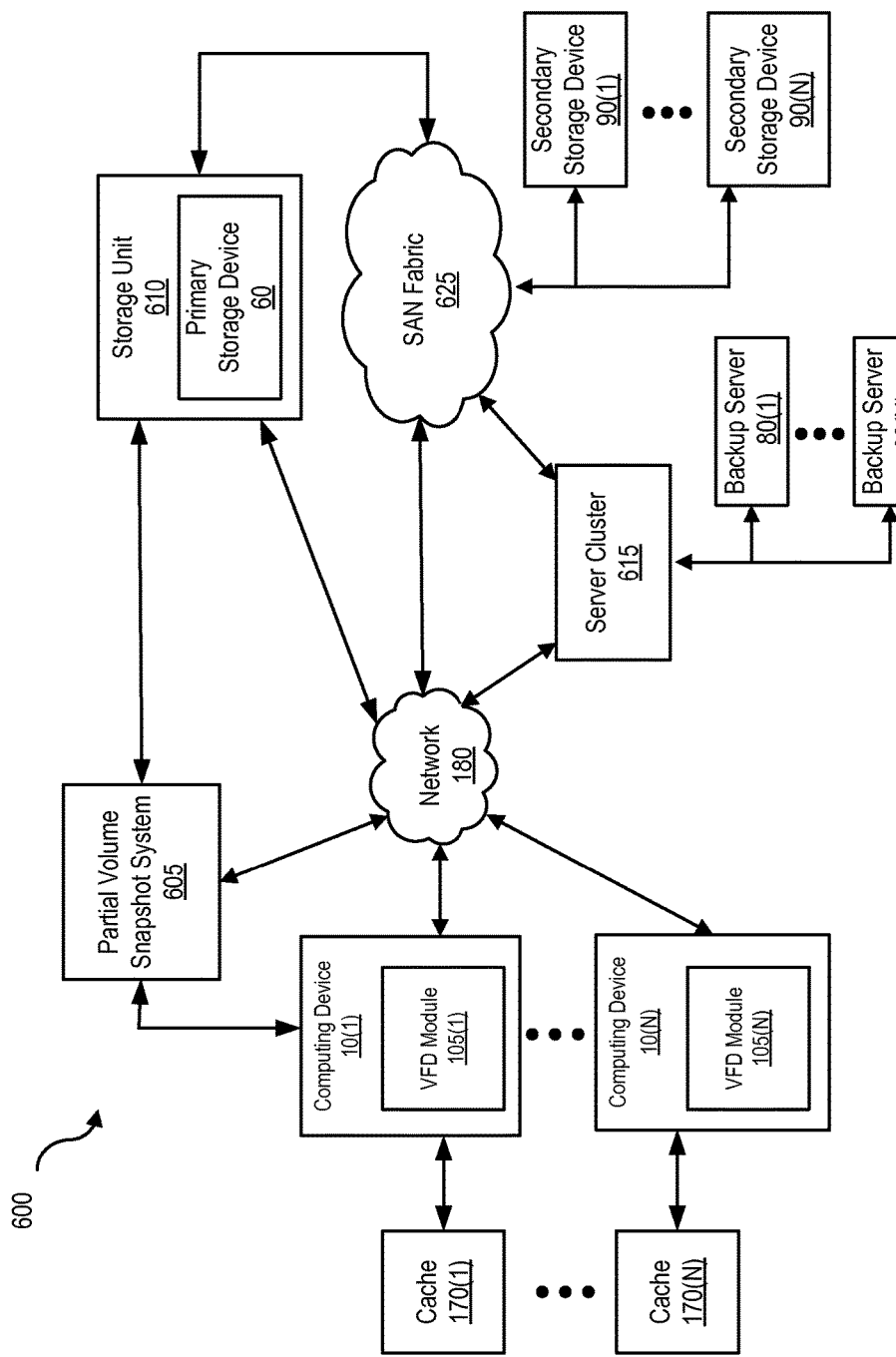
FIG. 6 is a block diagram of a networked system, illustrating how various computing devices can communicate via a network, according to one embodiment of the present invention.

FIG. 6 is a block diagram of a network architecture 600 in which backup server 80 and computing device 10 may be coupled to network 180. In certain embodiments, network-attached storage (NAS) devices may be configured to communicate with backup server 80 using various protocols, such as Network File System (NFS), Server Message Block (SMB), or Common Internet File System (CIFS).

Primary storage device 60 and secondary storage device 90 may also be connected to a network 180. Network 180 generally represents any type or form of computer network or architecture capable of facilitating communication between multiple computing devices. Network 180 may facilitate communication between backup server 80, primary storage device 60, and secondary storage device 90. In certain embodiments, and with reference to computing system 500 of FIG. 5, a communication interface, such as communication interface 545 in FIG. 5, may be used to provide connectivity between backup server 80 and network 180. It should be noted that the embodiments described and/or illustrated herein are not limited to the Internet or any particular network-based environment. For example, network 180 can be a Storage Area Network (SAN).

In at least one embodiment, all or a portion of one or more of the embodiments disclosed herein may be encoded as a computer program and loaded onto and executed by backup server 80, primary storage device 60, secondary storage device 90, or any combination thereof. All or a portion of one or more of the embodiments disclosed herein may also be encoded as a computer program, stored in backup server 80, computing device 10, and distributed over network 180.

In some examples, all or a portion of the computing device in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a volume filter driver module 105 may transform behavior of a backup server in order to cause the server to perform modifiable volume snapshots.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   creating a read-only snapshot of a primary volume;
   storing the read-only snapshot in a primary storage device, wherein
      the primary storage device is communicatively coupled to a computing device;
   attaching a volume filter driver to a snapshot volume of the read-only snapshot, wherein
      the volume filter driver permits a plurality of snapshot volumes to utilize the volume filter driver by virtue of being implemented at a volume level of the snapshot volume,
      the volume filter driver is an upper volume filter,
      prior to creating a backup image of the read-only snapshot, the upper volume filter intercepts a request intended to modify data in the read-only snapshot from an application executing on the computing device, and
      prior to creating the backup image of the read-only snapshot, the upper volume filter routes modifications intended for data in the read-only snapshot to a secondary storage device;
   detecting one or more modifications directed to data in the read-only snapshot, wherein
      the detecting is performed by the volume filter driver;
   upon detecting the one or more modifications, writing the one or more modifications to the secondary storage device instead of the primary storage device;
   creating the backup image, wherein
      the creating the backup image comprises exposing the read-only snapshot and the one or more modifications to backup software, and
      the creating the backup image further comprises synchronizing data from the read-only snapshot and the one or more modifications intended for data in the read-only snapshot, wherein
         the synchronized data is stored in the backup image on a backup server; and
   storing the backup image on the backup server.

2. The computer-implemented method of claim 1, wherein
   the attaching is performed after a snapshot of data in the primary storage device is taken, wherein the snapshot is the read-only snapshot.

3. The computer-implemented method of claim 1, wherein
   performing a write operation, wherein
      the write operation comprises using the volume filter driver to intercept and route the one or more modifications to the secondary storage device.

4. The computer-implemented method of claim 1, wherein
the one or more modifications are performed by a file system structure executing on the computing device.

5. The computer-implemented method of claim 4, wherein
the backup server executes the backup software; and
the backup software is agnostic to the file system structure executing on the computing device by virtue of the volume filter driver operating at a volume level of an operating system.

6. The computer-implemented method of claim 5, further comprising:
exposing the read-only snapshot on the primary storage device to the backup software; and
sending the one or more modifications intended for data in the read-only snapshot on the secondary storage device to the backup software.

7. The computer-implemented method of claim 4, further comprising:
determining that a snapshot is the read-only snapshot by determining that the snapshot cannot be modified prior to being backed up.

8. The computer-implemented method of claim 7, wherein
the request intended to modify the data in the read-only snapshot comprises a read transaction, a write transaction, a request to delete a file in the read-only snapshot, or a request to add a file to the read-only snapshot.

9. A non-transitory computer readable storage medium comprising program instructions executable to:
create a read-only snapshot of a primary volume;
store the read-only snapshot in a primary storage device, wherein
the primary storage device is communicatively coupled to a computing device;
attach a volume filter driver to a snapshot volume of the read-only snapshot, wherein
the volume filter driver permits a plurality of snapshot volumes to utilize the volume filter driver by virtue of being implemented at a volume level of the snapshot volume,
the volume filter driver is an upper volume filter,
prior to creating a backup image of the read-only snapshot, the upper volume filter intercepts a request intended to modify data in the read-only snapshot from an application executing on the computing device, and
prior to creating the backup image of the read-only snapshot, the upper volume filter routes modifications intended for data in the read-only snapshot to a secondary storage device;
detect one or more modifications directed to data in the read-only snapshot, wherein
the one or more modifications are detected by the volume filter driver;
upon detecting the one or more modifications, write the one or more modifications to the secondary storage device instead of the primary storage device;
create the backup image, wherein
creating the backup image comprises exposing the read-only snapshot and the one or more modifications to backup software, and
the creating the backup image further comprises synchronizing data from the read-only snapshot and the one or more modifications intended for data in the read-only snapshot, wherein
the synchronized data is stored in the backup image on a backup server; and
store the backup image on the backup server.

10. The non-transitory computer readable storage medium of claim 9, wherein
the volume filter driver is attached to the snapshot volume after a snapshot of data in the primary storage device is taken, wherein
the snapshot is the read-only snapshot; and
performing a write operation, wherein
the write operation comprises using the volume filter driver to intercept and route the one or more modifications to the secondary storage device.

11. The non-transitory computer readable storage medium of claim 9, wherein
the backup server executes the backup software; and
the backup software is agnostic to the file system structure executing on the computing device by virtue of the volume filter driver operating at a volume level of an operating system.

12. A system comprising:
one or more processors; and
a memory coupled to the one or more processors, wherein the memory stores program instructions executable by the one or more processors to:
create a read-only snapshot of a primary volume;
store the read-only snapshot in a primary storage device, wherein
the primary storage device is communicatively coupled to a computing device;
attach a volume filter driver to a snapshot volume of the read-only snapshot, wherein
the volume filter driver permits a plurality of snapshot volumes to utilize the volume filter driver by virtue of being implemented at a volume level of the snapshot volume,
the volume filter driver is an upper volume filter,
prior to creating a backup image of the read-only snapshot, the upper volume filter intercepts a request intended to modify data in the read-only snapshot from an application executing on the computing device, and
prior to creating the backup image of the read-only snapshot, the upper volume filter routes modifications intended for data in the read-only snapshot to a secondary storage device;
detect one or more modifications directed to data in the read-only snapshot, wherein
the one or more modifications are detected by the volume filter driver;
upon detecting the one or more modifications, write the one or more modifications to the secondary storage device instead of the primary storage device;
create the backup image, wherein
creating the backup image comprises exposing the read-only snapshot and the one or more modifications to backup software, and
creating the backup image further comprises synchronizing data from the read-only snapshot and the one or more modifications intended for data in the read-only snapshot, wherein
the synchronized data is stored in the backup image on a backup server; and
store the backup image on the backup server.

13. The system of claim 12, further comprising:
determining that a snapshot is the read-only snapshot by determining that the snapshot cannot be modified prior to being backed up.

14. The system of claim 12, wherein
the one or more modifications intended for data in the read-only snapshot comprise a read transaction, a write transaction, a request to delete a file in the read-only snapshot, or a request to add a file to the read-only snapshot.

15. A computer-implemented method comprising:
detecting a read-only snapshot, wherein
   the read-only snapshot is stored on a primary storage device,
   the read-only snapshot is unmodifiable prior to being backed up,
   the primary storage device is coupled to a computing device, and
   the computing device implements a file system structure;
upon detecting the read-only snapshot, attaching a volume filter driver to a snapshot volume associated with the read-only snapshot at a volume level of an operating system of the computing device, wherein
   the volume filter driver permits a plurality of snapshot volumes to utilize the volume filter driver by virtue of being implemented at a volume level of the snapshot volume,
   the volume filter driver is an upper volume filter,
   prior to creating a backup image of the read-only snapshot, the upper volume filter intercepts a request intended to modify data in the read-only snapshot from an application executing on the computing device, and
   prior to creating the backup image of the read-only snapshot, the upper volume filter routes modifications intended for data in the read-only snapshot to a secondary storage device;
detecting one or more modifications directed to data in the read-only snapshot, wherein
   the detecting is performed by the volume filter driver, and
   the one or more modifications are performed by the file system structure;
prior to creating the backup image of the read-only snapshot, intercepting, using the volume filter driver, the one or more modifications for the data in the read-only snapshot;
upon intercepting the one or more modifications intended for the data in the read-only snapshot, performing a write operation comprising the one or more modifications to the secondary storage device instead of the primary storage device;
creating the backup image, wherein
   creating the backup image comprises exposing the read-only snapshot and the one or more modifications to backup software, and
   creating the backup image further comprises synchronizing data from the read-only snapshot and the one or more modifications intended for data in the read-only snapshot, wherein
      the synchronized data is stored in the backup image on a backup server; and
storing the backup image on the backup server.

16. The computer-implemented method of claim 15, wherein
the backup software is agnostic to the file system structure executing on the computing device by virtue of the volume filter driver operating at the volume level of an operating system.

* * * * *